United States Patent
Esser-Kahn et al.

(10) Patent No.: US 9,855,525 B2
(45) Date of Patent: Jan. 2, 2018

(54) METHODS AND APPARATUSES FOR RECOVERING $CO_2$

(71) Applicant: Aaron Esser-Kahn, Irvine, CA (US)

(72) Inventors: Aaron Esser-Kahn, Irvine, CA (US); Du Nguyen, Irvine, CA (US)

(73) Assignee: Aaron Esser-Kahn, Irvine, CA (US)

( * ) Notice: Subject to any disclaimer, the term of this patent is extended or adjusted under 35 U.S.C. 154(b) by 296 days.

(21) Appl. No.: 14/705,937

(22) Filed: May 6, 2015

(65) Prior Publication Data
US 2016/0325225 A1    Nov. 10, 2016

(51) Int. Cl.
*B01D 53/14*    (2006.01)
*F01K 5/00*    (2006.01)

(52) U.S. Cl.
CPC ..... *B01D 53/1425* (2013.01); *B01D 53/1475* (2013.01); *B01D 53/1493* (2013.01); *F01K 5/00* (2013.01); *B01D 2252/202* (2013.01); *B01D 2252/204* (2013.01); *B01D 2252/20415* (2013.01); *B01D 2252/20442* (2013.01); *B01D 2252/20447* (2013.01); *B01D 2252/20473* (2013.01); *B01D 2252/20484* (2013.01); *B01D 2252/20489* (2013.01); *B01D 2253/102* (2013.01); *B01D 2253/106* (2013.01); *B01D 2253/304* (2013.01); *B01D 2255/104* (2013.01); *B01D 2255/106* (2013.01); *B01D 2255/20761* (2013.01); *B01D 2255/20776* (2013.01); *B01D 2256/24* (2013.01); *B01D 2257/504* (2013.01); *B01D 2258/0233* (2013.01);

(Continued)

(58) Field of Classification Search
CPC ... F01K 5/00; B01D 53/1425; B01D 53/1475; B01D 53/1493; B01D 2252/202; B01D 2252/204; B01D 2252/20415; B01D 2252/20442; B01D 2252/20447; B01D 2252/20473; B01D 2253/102; B01D 2253/106; B01D 2253/304; B01D 2255/104; B01D 2255/106; B01D 2255/20761; B01D 2255/20776; B01D 2256/24; B01D 2257/504; B01D 2259/0233; B01D 2259/0283; B01D 2259/06
USPC ..... 95/178–180, 183, 236; 96/243; 423/220, 423/226, 228, 229; 110/203, 345
See application file for complete search history.

(56) References Cited

U.S. PATENT DOCUMENTS

2012/0076711 A1*    3/2012    Gebald .............. B01D 53/0462
                                                        423/228
2014/0339072 A1*    11/2014    Jennings .................. B01J 27/04
                                                        204/157.15

(Continued)

OTHER PUBLICATIONS

"United States Greenhouse Gas Inventory Report: 1990-2013", EPA 430-R-15-004, Apr. 15, 2015, pp. 1-564.

(Continued)

*Primary Examiner* — Frank Lawrence
(74) *Attorney, Agent, or Firm* — Byrne Poh LLP; Nina R. Horan

(57) ABSTRACT

The present disclosure provides methods and apparatuses of recovering $CO_2$ from a gas stream. The methods regenerate $CO_2$ with high regeneration efficiencies, thereby lowering the overall energy cost for $CO_2$ capture.

20 Claims, 9 Drawing Sheets

(52) U.S. Cl.
CPC .. *B01D 2258/0283* (2013.01); *B01D 2258/06* (2013.01); *Y02C 10/04* (2013.01); *Y02C 10/06* (2013.01)

(56) References Cited

U.S. PATENT DOCUMENTS

| | | | | |
|---|---|---|---|---|
| 2016/0158690 | A1* | 6/2016 | Puxty | B01D 53/1487 423/228 |
| 2016/0166975 | A1* | 6/2016 | Sieder | B01D 53/1418 95/187 |

OTHER PUBLICATIONS

Babatunde et al., "Energy Performance of Stripper Configuration for CO2 Capture by Aqueous Amines", in Industrial and Engineering Chemistry Research, vol. 45, Nov. 11, 2005, pp. 2457-2464.

Camper et al., "Room-Temperature Ionic Liquid-Amine Solutions: Tunable Solents for Efficient and Reversible Capture of CO2", in Industrial and Engineering Chemistry Research, vol. 47, No. 21, Oct. 8, 2008, pp. 8496-8498.

D'Alessandro et al., "Carbon Dioxide Capture: Prospects for New Materials", in Angewandte Chemie International Edition, vol. 49, Jul. 22, 2010, pp. 6058-6082.

EPA, "Climate Change", last updated Jan. 19, 2017, pp. 1-3, available at: epa.gov/climatechange/ghgemissions/usinventoryreport.html.

Freguia et al., "Modeling of CO2 Capture by Aqueous Monoethanolamine", in Journal of American Institute of Chemical Engineers, vol. 49, No. 7, Jul. 2003, pp. 1676-1686.

Friedlingstein et al., "Update on CO2 Emissions", in Nature Geoscience, vol. 3, Nov. 2010, pp. 811-812.

Govorov et al., "Generating Heat with Metal Nanoparticles", in Nano Today, vol. 2, No. 1, Feb. 2007, pp. 30-38.

Han et al., "Thermal Properties of Carbon Black Aqueous Nanofluids for Solar Absorption", in Nanoscale Research Letters, vol. 6, Jul. 18, 2011, pp. 457.

Heldebrant et al., "CO2-Binding Organic Liquids (CO2BOLs) for Post-Combustion CO2 Capture", in Energy Procedia, vol. 1, No. 1, Feb. 2009, pp. 1187-1195.

Heldebrant et al., "Organic Liquid CO2 Capture Agents with High Gravimetric CO2 Capacity", in Energy & Environmental Science, Jul. 2008, pp. 487-493.

Herzog, H., "What Future for Carbon Capture and Sequestration?", in Environmental Science and Technology, Apr. 1, 2001, pp. 148-153.

Li et al., "Design and Synthesis of an Exceptionally Stable and Highly Porous Metal-Organic Framework", in Nature, vol. 402, Nov. 18, 1999, pp. 276-279.

Lively et al., "Hollow Fiber Adsorbents for CO2 Removal from Flue Gas", in Industrial and Engineering Chemistry Research, vol. 48, Jun. 11, 2009, pp. 7314-7324.

Neumann et al., "Compact Solar Autoclave based on Steam Generation using Broadband Light-Harvesting Nanoparticles", in Proceedings of the National Academy of Sciences of the United States of America, vol. 110, No. 29, Jul. 2013, pp. 11677-11681.

Neumann et al., "Solar Vapor Generation Enabled by Nanoparticles", in ACS Nano, vol. 7, No. 1, Nov. 2012, pp. 42-49.

Nguyen et al., "Photothermal Release of CO2 from Capture Solutions using Nanoparticles", in Energy & Environmental Science, vol. 7, May 2014, pp. 2603-2607.

Oyenekan et al., "Energy Performance of Stripper Configurations for CO2 Capture by Aqueous Amines", in Industrial & Engineering Chemistry Research, vol. 45, No. 8, Nov. 11, 2005, pp. 2457-2464.

Taylor et al., "Vapor Generation in a Nanoparticle Liquid Suspension using a Focused, Continuous Laser", in Applied Physics Letters, vol. 95, No. 16, Oct. 2009, pp. 161907.

Teramoto et al., "Separation of Ethylene from Ethane by a Flowing Liquid Membrane Using Silver Nitrate as a Carrier", in Journal of Membrane Sciences, vol. 45, Aug. 15, 1988, pp. 115-136.

Zhang et al., "Photothermal Conversion Characteristics of Gold Nanoparticle Dispersions", in Solar Energy, vol. 100, Feb. 2014, pp. 141-147.

* cited by examiner

METHODS AND APPARATUSES FOR RECOVERING $CO_2$

BACKGROUND OF THE DISCLOSURE

In the past 25 years, the detrimental effects of $CO_2$ emissions have been realized. However, nearly 29 billion tons of $CO_2$ are still released into the atmosphere each year (P. Friedlingstein et al., Nat. Geosci., 2010, 3, 811-812.) 6 billion tons are released in the US alone (see U.S. Greenhouse Gas Inventory Report: 1990-2013. EPA 430-R-15-004. Apr. 15, 2015; and see also the world wide web at epa.goviclimatechange/ghgemissions/usinventoryreport.html). Much of this comes from point sources of $CO_2$ such as power plants, automobiles and the cement industry.

There are several known technologies that can capture $CO_2$ from gas streams, including metal organic frameworks, membrane-based systems, and liquid capture, but the additional energy cost for their removal of $CO_2$ hinders their application for commercial $CO_2$ treatment. (R. P. Lively et al., Ind. Eng. Chem. Res., 2009, 48, 7314-7324; D. Camper et al., Ind. Eng. Chem. Res., 2008, 47, 8496-8498; H. Li, et al., Nature, 1999, 402, 276-279; H. J. Herog, Environ. Sci. Technol., 2001, 35, 148A-153A; D. M. D'Alessandro et al., Angew. Chem., Int. Ed., 2010, 49, 6058-6082: A. Oyenekan and G. T. Rochelle, Ind. Eng. Chem. Res., 2006, 45, 2457-2464; and S. Freguia and G. T. Rochelle, AIChE J., 2003, 49, 1676-1686.)

For example, in liquid capture approaches, such as aqueous monoethanolamine (MEA), the additional energy cost is the result of the heat capacity of water (4.18 J $g^{-1}K^{-1}$), the regeneration temperature (up to 120° C.) and the chemical bond energy between MEA and $CO_2$ (83 kJ $mol^{-1}$) (A. Oyenekan and G. T. Rochelle, Ind. Eng. Chem. Res., 2006, 45, 2457-2464; and S. Freguia and G. T. Rochelle, AIChE J., 2003, 49, 1676-1686.)

Accordingly, there exists a need to develop a method and apparatus to remove $CO_2$ from gas streams that lowers the energy of capture and regeneration, or that harnesses alternative energy sources.

SUMMARY OF THE DISCLOSURE

The present disclosure relates to the discovery that photothermally heated nanoparticles exhibit enhanced regeneration of captured $CO_2$ as compared to existing liquid $CO_2$ capture methods. The use of photo-thermal energy lowers the energy required for capture and regeneration and replaces parasitic energy with renewable alternative energy sources.

In certain embodiments, the present disclosure provides a method of recovering carbon dioxide from a gas stream. The method comprises the steps of (a) contacting a gas stream comprising carbon dioxide with an absorption liquid; (b) contacting the absorption liquid with a nanoparticle, thereby forming a nanofluid; and (c) photothermally releasing carbon dioxide from the nanofluid.

In certain embodiments, the present disclosure provides an apparatus for recovering carbon dioxide from a gas stream. The apparatus comprises: (a) a boiler that generates steam from the combustion of a fuel and that generates a gas stream comprising carbon dioxide; (b) a heat exchanger that heats an absorption liquid; (c) an absorber that is supplied the gas stream from the boiler and that allows carbon dioxide in the gas stream to be absorbed in the absorption liquid; (d) a solar stripper comprising nanoparticles that is supplied the absorption liquid comprising carbon dioxide from the absorber and that photothermally releases carbon dioxide gas from the absorption liquid; (e) a compressor that compresses the carbon dioxide gas released in the solar stripper, (f) a generator that produces energy for the carbon dioxide compressor; and (g) a turbine that is supplied with steam from the boiler and that rotates the generator.

BRIEF DESCRIPTION OF THE FIGURES

FIG. 8A shows the $^{13}C$ NMR spectrum obtained for an absorption liquid comprising MEA and NCB prior to contact with $CO_2$. FIG. 8B shows the $^{13}C$ NMR spectrum for the absorption liquid comprising MEA and NCB following contact with $CO_2$. FIG. 8C shows the $^{13}C$ NMR spectrum for the absorption liquid comprising MEA and NCB following photothermal release of $CO_2$.

DETAILED DESCRIPTION OF THE INVENTION

In order that the invention herein described may be fully understood, the following detailed description is set forth.

Unless defined otherwise, all technical and scientific terms used herein have the same meaning as those commonly understood by one of ordinary skill in the art to which this invention belongs. Although methods and materials similar or equivalent to those described herein can be used in the practice or testing of the present invention, suitable methods and materials are described below. The materials, methods and examples are illustrative only, and are not intended to be limiting. All publications, patents and other documents mentioned herein are incorporated by reference in their entirety. The mention of such documents is not to be construed as an admission that such document is prior art to the present disclosure.

Throughout this specification, the word "comprise" or variations such as "comprises" or "comprising" will be understood to imply the inclusion of a stated integer or groups of integers but not the exclusion of any other integer or group of integers.

The term "a" or "an" may mean more than one of an item.

The terms "and" and "or" may refer to either the conjunctive or disjunctive and mean "and/or".

The term "about" means within plus or minus 10% of a stated value. For example, "about 100" would refer to any number between 90 and 110.

The term "monoethanolamine" can be abbreviated as "MEA".

The term "a $CO_2$ binding organic liquid" can be abbreviated as "$CO_2BOL$".

Methods of Recovering Carbon Dioxide

It has been discovered that photo-thermally heated nanoparticles regenerate $CO_2$ from absorption liquids, releasing more $CO_2$ and at lower overall solution temperatures than existing liquid capture methodologies.

Figure 1:
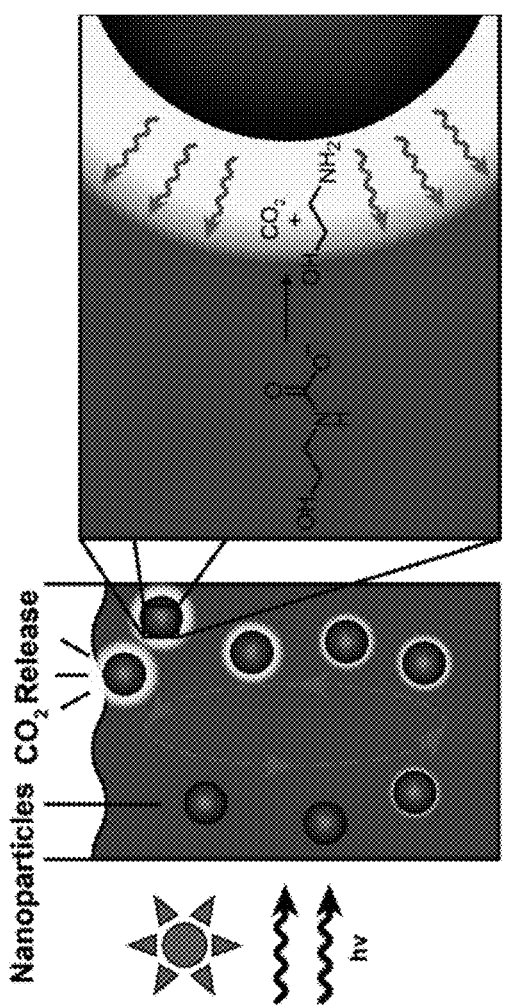
FIG. 1 shows a schematic diagram of carbon black nanoparticle $CO_2$ regeneration.

Without being bound by theory, it is believed that the nanoparticles absorb external light and convert it to thermal energy, resulting in a high local temperature near the nanoparticle surface. As shown in FIG. 1, at the nanoparticle surface, $CO_2$ is regenerated from a carbon dioxide capture agent, forming a gas bubble around the nanoparticle. The bubble can grow large enough to force the nanoparticle to the surface of the absorption liquid and release $CO_2$.

Accordingly, the present disclosure provides a method of recovering carbon dioxide from a gas stream. The method comprises:
  a. contacting the gas stream comprising carbon dioxide with an absorption liquid;
  b. contacting the absorption liquid with a nanoparticle, thereby forming a nanofluid; and
  c. photothermally releasing carbon dioxide from the nanofluid.

The method can be used to remove carbon dioxide from any gas stream. Examples of gas streams that can be used include, but are not limited to, gas streams from a power plant, cement kiln, methane gas, e.g., from the ground, carbon dioxide in enclosed human living spaces, natural gas and air. In one embodiment, the gas stream comprises flue gas. In one embodiment, the flue gas is from coal combustions. In one embodiment, the gas stream comprises methane gas. In another embodiment, the gas stream comprises carbon dioxide in enclosed human living spaces. In another embodiment, the gas stream comprises air.

In one embodiment, the gas stream further comprises argon, nitrogen, oxygen or helium.

In step (a), a gas stream is contacted with an absorption liquid. In some embodiments, the gas stream contacts the absorption liquid through a porous membrane.

The absorption liquid used in the method comprises a carbon dioxide capture agent and a solvent. The carbon dioxide capture agent may be an amine or an organic liquid.

In certain embodiments, the carbon dioxide capture agent is an amine. In one embodiment, the amine is monoethanolamine, diethanolamine, methyldiethanolamine, piperidine, piperazine, piperadone, piperidinol, diglycolamine, diisopropanolamine or combinations thereof. In one embodiment, the amine is monoethanolamine, In certain embodiments, the carbon dioxide capture agent is an organic liquid, e.g., a $CO_2$ binding organic liquid ($CO_2BOL$). In one embodiment, the $CO_2BOL$ comprises a base and an alcohol.

The base component of the $CO_2BOL$ can be any known base, including, but not limited to, an amine, an amidine, an imidazole compound or a guanidine compound. In some embodiments, the base is diazabicyclo[5.4.0]-undec-7-ene (DBU). In other embodiments, the base is a guanidine compound. In some embodiments, the base is an alkylguanidine. In some embodiments, the base is 1,1,3,3-tetramethylguanidine or Barton's base. In some embodiments, the base is 1-((1,3-dimethylimidazolidin-2-ylidene)amino)propan-2-ol.

The alcohol component of the $CO_2BOL$ can be any known alcohol. In one embodiment, the alcohol is methanol, ethanol, propanol, butanol, pentanol, hexanol, heptanol, octanol, isomers thereof or combinations thereof. In one embodiment, the alcohol is butanol.

In one embodiment, the $CO_2BOL$ comprises an alkylguanidine and an alcohol. In another embodiment, the $CO_2BOL$ comprises 1,1,3,3-tetramethylguanidine and an alcohol. In another embodiment, the $CO_2BOL$ comprises an alkylguanidine and butanol. In another embodiment, the $CO_2BOL$ comprises 1,1,3,3-tetramethylguanidine and butanol.

In embodiments in which the absorption liquid comprises an amine, the solvent is selected from water, methyl-t-butyl ether, tetrahydrofuran, ethyl acetate, 2-propanol, dimethoxyethane, 2-butanol, 3-pentanol, 1-butanol, dimethylformamide, diglyme, 1-heptanol, 1-octanol, ethylene glycol, NMP, ethyl benzoate, diethyethylene glycol, or di-n-butylphthalate. In one embodiment, the solvent is water.

The amount of amine present in the absorption liquid is within the range of from about 0.1 wt % to about 50 wt % amine in solvent. In some embodiments, the amount of amine present in the absorption liquid is within the range of from about 10 wt % to about 40 wt % amine in solvent. In some embodiments, the amount of amine present in the absorption liquid is within the range of from about 20 wt % to about 35 wt % amine in solvent.

In one embodiment, the solvent is water and the amount of amine is within the range of from about 0.1 wt % to about 50 wt % amine in water. In some embodiments, the amount of amine present in the absorption liquid is within the range of from about 10 wt % to about 40 wt % amine in water. In some embodiments, the amount of amine present in the absorption liquid is within the range of from about 20 wt % to about 35 wt % amine in water.

In embodiments in which the absorption liquid comprises $CO_2BOL$, the solvent is a polar protic solvent or a polar aprotic solvent. In one embodiment, the solvent is dimethylformamide or acetonitrile.

The ratio of base to alcohol present in the absorption liquid is about 1 to about 1. The amount of base and alcohol in solvent can be varied from neat (i.e., no solvent) to about 0.01 M. In some embodiments, the amount of base and alcohol in solvent is about 0.001 M. In other embodiments, the amount of base and alcohol in solvent is about 0.005 M. In some embodiments, the amount of base and alcohol in solvent is about 0.0075 M. In some embodiments, the amount of base and alcohol in solvent is about 0.01 M.

The nanoparticle used in the method can be any nanoparticle capable of converting light energy to thermal energy. In one embodiment, the nanoparticle exhibits surface plasmon resonance. In another embodiment, the nanoparticle exhibits black body radiation.

Useful nanoparticles comprise silica, magnetite, carbon black, a carbon nanotube, activated carbon, gold, silver, copper or tungsten. In one embodiment, the nanoparticle is carbon black, a carbon nanotube, or activated carbon. In another embodiment, the nanoparticle is carbon black. In another embodiment, the nanoparticle is carbon black N115. In another embodiment, the nanoparticle comprises a carbon nanotube. In another embodiment, the nanoparticle comprises activated carbon. In another embodiment, the nanoparticle comprises silica. In another embodiment, the nanoparticle comprises magnetite. In another embodiment, the nanoparticle comprises gold. In another embodiment, the nanoparticle comprises silver. In another embodiment, the nanoparticle comprises copper. In another embodiment, the nanoparticle comprises tungsten.

The properties of the nanoparticle can be varied to increase photothermal release of $CO_2$. For example, photothermal release of $CO_2$ depends on the particle shape, size, aggregate size, surface area and surface chemistry of the nanoparticle. Photo-thermal efficiency can be determined in accordance with the method described in Example 1.

In one embodiment, the nanoparticle is spherical, cylindrical, ovoid, or any shape beyond a sphere. In another embodiment, the nanoparticle is spherical.

In one embodiment, the nanoparticle has a particle size in the range from about 50 nm to about 500 nm. In another embodiment, the nanoparticle has a particle size in the range from about 50 nm to about 250 nm. In another embodiment, the nanoparticle has a particle size in the range from about 70 nm to about 100 nm.

In one embodiment, the nanoparticle has an aggregate size in the range from about 1 μm to about 10 μm. In another embodiment, the nanoparticle has an aggregate size in the range from about 1 μm to about 5 μm. In another embodiment, the nanoparticle has an aggregate size in the range from about 1 μm to about 2 μm.

In one embodiment, the nanoparticle has a surface area in the range from about 0.005 $m^2/g$ to about 10,000 $m^2/g$. In another embodiment, the nanoparticle has a surface area in the range from about 1 $m^2/g$ to about 1,000 $m^2/g$. In another embodiment, the nanoparticle has a surface area in the range from about 1 $m^2/g$ to about 100 $m^2/g$.

In one embodiment, the nanoparticle is cationic. In another embodiment, the nanoparticle is anionic. In another embodiment, the nanoparticle is reactive with carbon dioxide.

In one embodiment, the nanoparticle comprises a sulfate, an amine, a carboxylate, a urea, a hydrocarbon chain, or a catalyst. In another embodiment, the nanoparticle comprises an amine. In another embodiment, the nanoparticle comprises a primary amine. In another embodiment, the nanoparticle comprises a secondary amine.

In step (b), the absorption liquid is contacted with a nanoparticle, thereby forming a nanofluid. In one embodiment, the nanofluid comprises from about 0.0001 wt % to about 1 wt % nanoparticle. In another embodiment, the nanofluid comprises from about 0.01 wt/o to about 1 wt % nanoparticle. In another embodiment, the nanofluid comprises from about 0.1 wt % to about 0.5 wt % nanoparticle.

In step (c), $CO_2$ is photothermally released from the nanofluid. In certain embodiments, the photothermal step is accomplished by exposing the nanofluid to light. In one embodiment, the light source is an LED light, photography spotlight, sunlight or a combination thereof. In another embodiment, the light source is sunlight. In another embodiment, the light source is an LED light. In another embodiment, the light source is a photography spotlight. In one embodiment, the light source has a power of about 0.8 W or about 2.6 W.

In one embodiment, the method further comprises the step of maintaining the nanofluid at a temperature in the range from about −78° C. to about 300° C. In another embodiment, the method comprises the step of maintaining the nanofluid at a temperature in the range from about 0° C. to about 200° C. In another embodiment, the method comprises the step of maintaining the nanofluid at a temperature in the range of about 45° C. to about 150° C. In another embodiment, the method comprises the step of maintaining the nanofluid at temperature in the range of about 45° C. to about 100° C. In another embodiment, the method comprises the step of maintaining the nanofluid at temperature in the range of about 45° C. to about 75° C. In another embodiment, the method comprises the step of maintaining the nanofluid at temperature in the range of about 45° C. to about 60° C.

Advantageously, lowering the temperature of the nanofluid increases the efficiency of a carbon capture and removal process. For example, known methods require heating the absorption liquid to about 120° C. to enable nucleate boiling, which then releases the $CO_2$ from the absorption liquid, e.g., an aqueous amine. Using temperatures lower than 120° C. can significantly lower the overall energy required to release $CO_2$.

Accordingly, in one embodiment, the method comprises the step of maintaining the nanofluid at temperature of less than about 100° C. In another embodiment, the method comprises the step of maintaining the nanofluid at temperature of less than about 75° C. In another embodiment, the method comprises the step of maintaining the nanofluid at temperature of less than about 60° C.

In certain embodiments, the nanoparticle is carbon black and the absorption liquid comprises an amine and a solvent. In certain embodiments, the nanoparticle is carbon black and the absorption liquid comprises monoethanolamine and a solvent. In certain embodiments, the nanoparticle is carbon black and the absorption liquid comprises an amine and water. In certain embodiments, the nanoparticle is carbon black and the absorption liquid comprises monoethanolamine and water.

In other embodiments, the nanoparticle is carbon black and the absorption liquid comprises $CO_2BOL$ and an alcohol. In other embodiments, the nanoparticle is carbon black and the absorption liquid comprises 1,1,3,3-tetramethylguanidine and an alcohol. In other embodiments, the nanoparticle is carbon black and the absorption liquid comprises $CO_2BOL$ and butanol. In other embodiments, the nanoparticle is carbon black and the absorption liquid comprises 1,1,3,3-tetramethylguanidine and butanol.

Methods of Recovering Ethylene

The present disclosure also provides a method of recovering ethylene from a gas stream. The method comprises:
a. contacting the gas stream comprising ethylene with an absorption liquid;
b. contacting the absorption liquid with a nanoparticle, thereby forming a nanofluid; and
c. photothermally releasing ethylene from the nanofluid.

In this embodiment, the absorption liquid comprises silver nitrate to capture ethylene. See Masaaki Teramoto, Hideto Matsuyama, Takumi Yamashiro, Sueaki Okamoto, Separation of ethylene from ethane by a flowing liquid membrane using silver nitrate as a carrier, Journal of Membrane Science, Volume 45, Issues 1-2, July 1989, Pages 115-136, ISSN 0376-7388.

The nanoparticles used in step (b) and the manner in which steps (a), (b) and (c) are performed are as described in the preceding section.

Methods of Derivatizing Carbon Dioxide

The present disclosure also provides a method of derivatizing carbon dioxide. The method comprises:
a. contacting the gas stream comprising carbon dioxide with an absorption liquid;
b. contacting the absorption liquid with a nanoparticle, thereby forming a nanofluid,
c. photothermally releasing carbon dioxide from the nanofluid; and d. derivatizing the released carbon dioxide in the nanofluid.

In this method, the carbon dioxide may be converted to carbon (graphite), methane, acetic acid, formic, acid, methanol, ethane, butane, propane, pentane, and other higher order hydrocarbons both branched and unbranched. Methods of converting carbon dioxide are known in the art, e.g., the Sabatier and Bosch reactions. For example, in the Sabatier reaction, step (d) comprises converting carbon dioxide into methane. In the Bosch reaction, step (d) comprises converting carbon dioxide into carbon (graphite). In these embodiments, step (d) comprises contacting the released carbon dioxide with hydrogen gas and the appropriate catalytic nanoparticle.

Known methods of derivatizing carbon dioxide require removal of the captured $CO_2$ for further reaction. However, in the method of the present disclosure, the captured $CO_2$ may be derivatized within the nanofluid. By avoiding the removal step, efficiency is increased, the energy demand is lowered, and the overall cost is lowered. In addition, any apparatus for performing this method would have a smaller footprint than those for performing known methods.

Apparatuses for Recovering Carbon Dioxide

The present disclosure provides an apparatus for recovering $CO_2$ from a gas stream. The apparatus comprises (a) a boiler that generates steam from the combustion of a fuel and that generates a gas stream comprising carbon dioxide; (b) a heat exchanger that heats an absorption liquid; (c) an absorber that is supplied the gas stream from the boiler and that allows carbon dioxide in the gas stream to be absorbed in the absorption liquid; (d) a solar stripper comprising nanoparticles that is supplied the absorption liquid from the absorber and that photothermally releases carbon dioxide gas from the absorption liquid; (e) a compressor that compresses the carbon dioxide gas released in the solar stripper; (f) a generator that produces energy for carbon dioxide compressor; and (g) a turbine that is supplied with steam from the boiler and that spins the generator.

Figure 2:
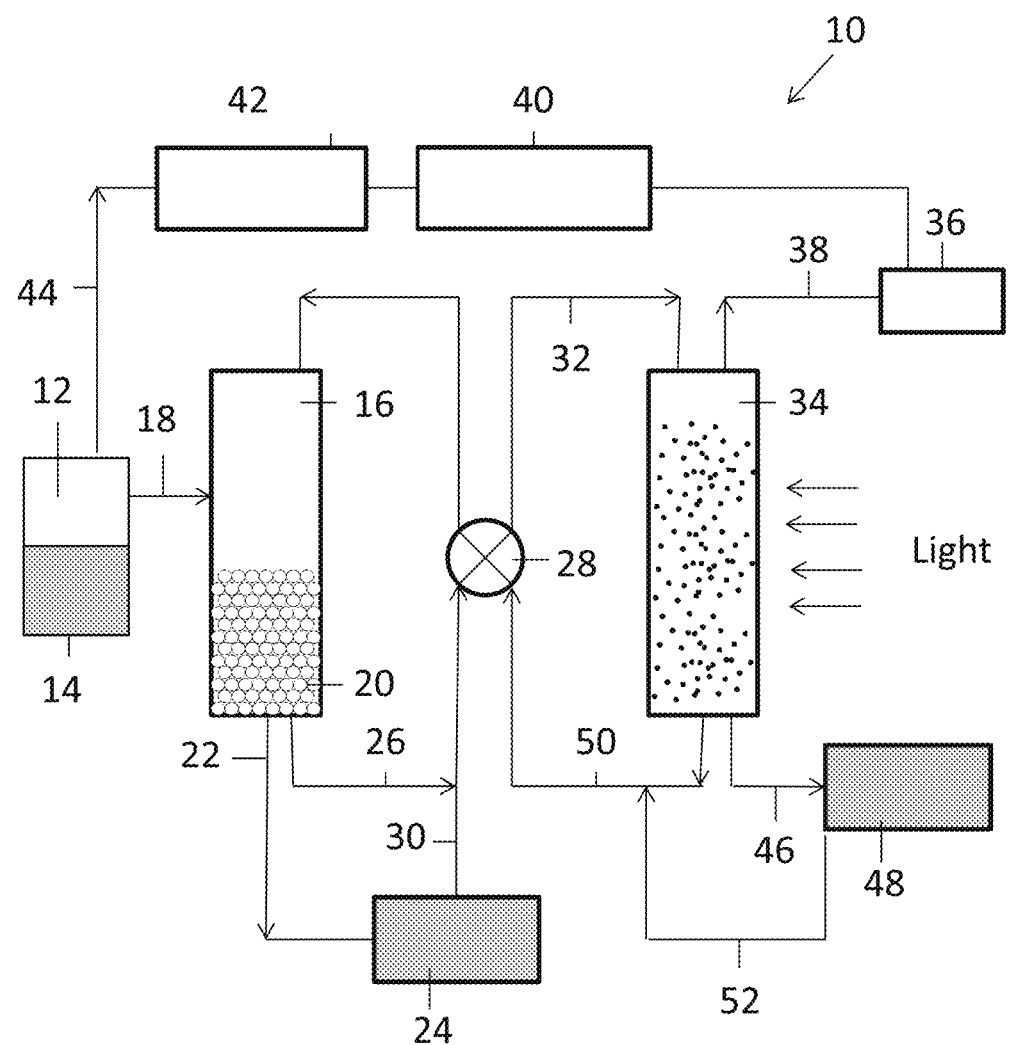
FIG. 2 is a schematic diagram of a first exemplary apparatus for recovering $CO_2$ from a gas stream.

FIG. 2 is a schematic diagram of apparatus 10, which is designed to recover $CO_2$ from a gas stream. The gas stream comprising $CO_2$ 12 is generated in boiler 14 and is fed into absorber 16 via conduit 18. Absorber 16 comprises a plurality of conduits (not shown) for introducing the absorption liquid 20 or components of thereof (i.e., the carbon capture agent and solvent). When the $CO_2$ containing gas stream 12 is contacted with the absorption liquid, the $CO_2$ is absorbed from the gas stream. The gas stream having a reduced content of $CO_2$ is transported to the atmosphere or to a secondary processing element. The absorption liquid comprising captured $CO_2$ ("rich absorption liquid") is optionally transported via conduit 22 to solvent storage tank 24 or via conduit 26 to heat exchanger 28. Solvent storage tank 24 can be fed the rich absorption liquid during the night and can discharge during the day via conduit 30 to heat exchanger 28. Heat exchanger 28 maintains the temperature of absorption liquid comprising captured $CO_2$ in the desired temperature range, as discussed above. The heated absorption liquid comprising captured $CO_2$ is transported via conduit 32 to solar stripper 34. Solar stripper 34 comprises nanoparticles. When exposed to light, e.g., sunlight, the nanoparticles photothermally release $CO_2$ from the absorption liquid. The released $CO_2$ is transported to the compressor 36 via conduit 38. Compressor 36 compresses the $CO_2$ gas released in the solar stripper 34 using energy produced by generator 40 and turbine 42. Turbine 42 is supplied with steam from the boiler 14 via conduit 44. The absorption liquid having a reduced content of $CO_2$ ("lean absorption liquid) is optionally transported from the solar stripper 34 via conduit 46 to solvent storage tank 48 or via conduit 50 to absorber 16. Solvent storage tank 48 can be fed the lean absorption liquid during the day and can discharge during the night via conduit 52 to absorber 16.

While not shown in FIG. 2, the apparatus of the disclosure may be combined with a conventional steam stripper. This combined apparatus can be configured such that the photothermal apparatus is only activated during days when the sun is shining (100-200 days) and the steam stripper apparatus is activated on the other days. By combining the conventional steam stripper with the apparatus of the disclosure, the overall energy required for recovering $CO_2$ is reduced considerably.

Also not shown in FIG. 2, the apparatus of the disclosure may be combined with a power plant to recover $CO_2$ from flue gas streams. In some embodiments, the apparatus is combined with a power plant and a conventional steam stripper.

In certain embodiments, apparatus 10 may also be combined with a solar collector. Solar collectors are well-known in the art and are used for converting sunlight to electrical energy. When combined with apparatus 10, the solar collector comprises rich absorption liquid and nanoparticles. When light contacts the solar collector, the nanoparticles photothermally release $CO_2$.

In certain embodiments, apparatus 10 may be configured to derivatize the released carbon dioxide. For example, in this embodiment, the solar stripper comprises a plurality of conduits to transport the reagents necessary for derivatization and to transport the derivatized product from the solar stripper to a compressor, which compresses the derivatized product.

Figure 3:
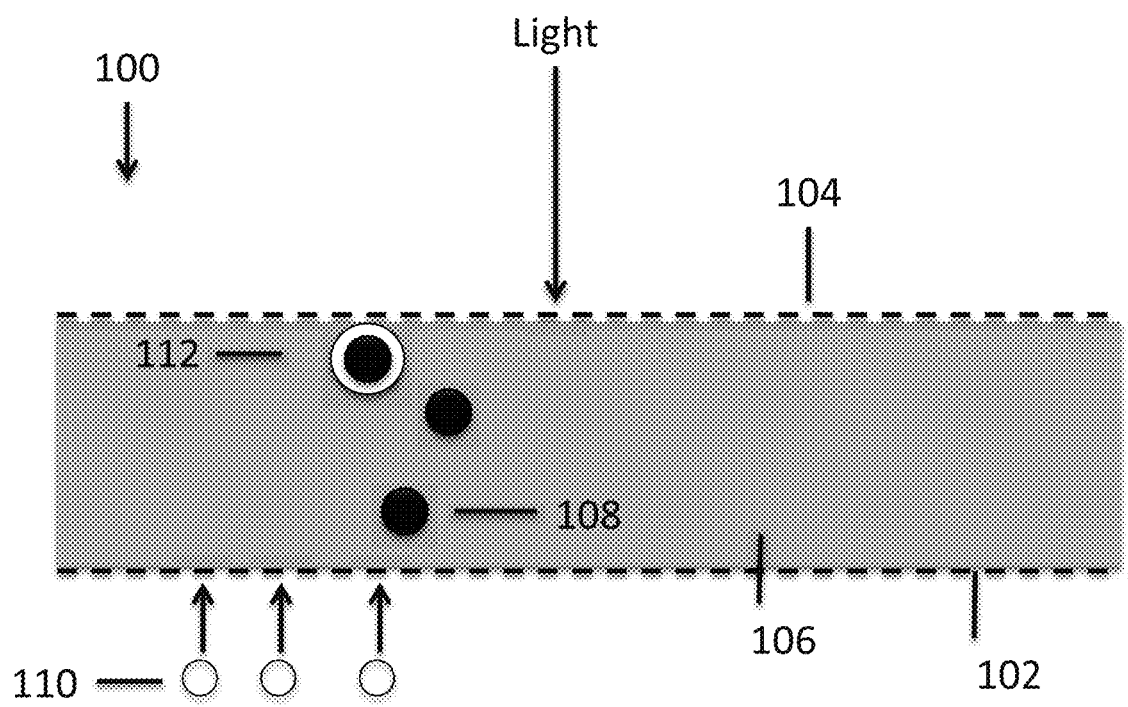
FIG. 3 is a schematic diagram of a second exemplary apparatus for recovering $CO_2$ from a gas stream.

FIG. 3 is a schematic diagram of apparatus 100, which is designed to recover $CO_2$ from a gas stream using liquid-sandwich membranes. The apparatus 100 includes porous membranes 102, 104 and a liquid portion 106. The liquid portion 106 comprises a nanofluid, (i.e., an absorption liquid and nanoparticles 108). The gas stream 110 comprising $CO_2$ passes along porous membrane 102. The $CO_2$ diffuses through the membrane pores (pore is about 1 nm to about 1 micron in diameter). The $CO_2$ is captured by the $CO_2$ capture agent (e.g., monoethanolamine). Light (e.g., sunshine) is applied onto porous membrane 104. With the applied light, the nanoparticles are photothermally heated (112), which causes the release of $CO_2$. The released $CO_2$ then diffuses out through porous membrane 104.

Apparatus 100 may be used in rebreather methods, e.g., in underwater or space expeditions. Known rebreather methods require the capture and removal of $CO_2$ in enclosed spaces and then liberation of that $CO_2$ or conversion of $CO_2$ back to oxygen for other higher molecular weight species. Apparatus 100 may be used to regenerate absorption liquids with lower total energy, as well as potentially using external energy derived from light (e.g., sunlight). Advantageously, apparatus 100 provides a small footprint, thereby minimizing costs and space, two important features for remote missions.

EXAMPLES

In order that this invention be more fully understood, the following examples are set forth. These examples are for the purpose of illustration only and are not to be construed as limiting the scope of the invention in any way.

Example 1

$CO_2$ Regeneration Measurements

Figure 4A:
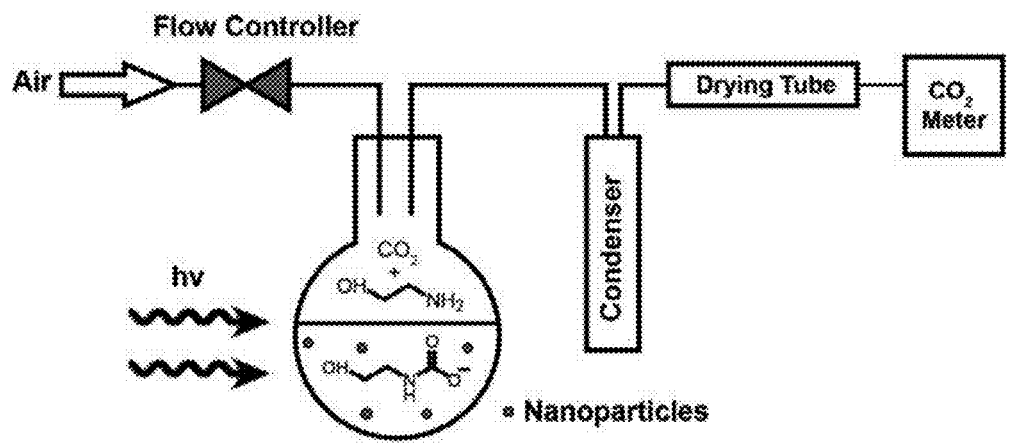
FIG. 4A shows an experimental schematic diagram for $CO_2$ regeneration measurements.

FIG. 4A shows an experimental schematic for $CO_2$ regeneration measurements. As shown, carbon black nanoparticles are added to an absorption liquid, such as MEA. Air flows through the flask, across a condenser and drying tube, finally reaching a $CO_2$ meter. Light shines through the flask, releasing $CO_2$-measured by the $CO_2$ meter. The concentration of $CO_2$, light irradiance, and flow rate are used to calculate the regeneration efficiency.

The regeneration efficiency was measured using the $CO_2$ release rate and actinic light. A 50 mL round bottom flask containing 40 mL of the nanofluid (nanoparticle used was carbon black) was loaded gravimetrically with $CO_2$ by bubbling the solution with pure $CO_2$ to 10 wt % (0.5 mol $CO_2$/mol MEA) loading The flask was then connected to a constant air flow of 0.2 L/min and stirred at 500 rpm. The light source was turned on, initiating the photothermal release of $CO_2$ into the gas detection stream. To remove any evaporating liquids from the system, the gas stream was filtered through condensing and drying tubes. Last, to measure $CO_2$ concentration, the output of the system flowed through an IR $CO_2$ meter. Concentration and flow rate were combined to calculate the release rate of $CO_2$. Experiments were run in triplicate. Repeated measurements and comparisons to mass balance measurements were also conducted to validate the methodology. Light sources included LED lights or photography spotlights with powers of 0.8 W and 2.6 W respectively (incident to the flask). The refraction and Fresnel reflection of light resulted in 85% of the incident light passing into the flask. The intensity output was measured using an Ambient Weather TM-206 Solar Power Meter with a spectral sensitivity range of 400 nm to 1100 nm. Each system was characterized with respect to the amount of radiant energy required per mol of $CO_2$ released.

Figure 4B:
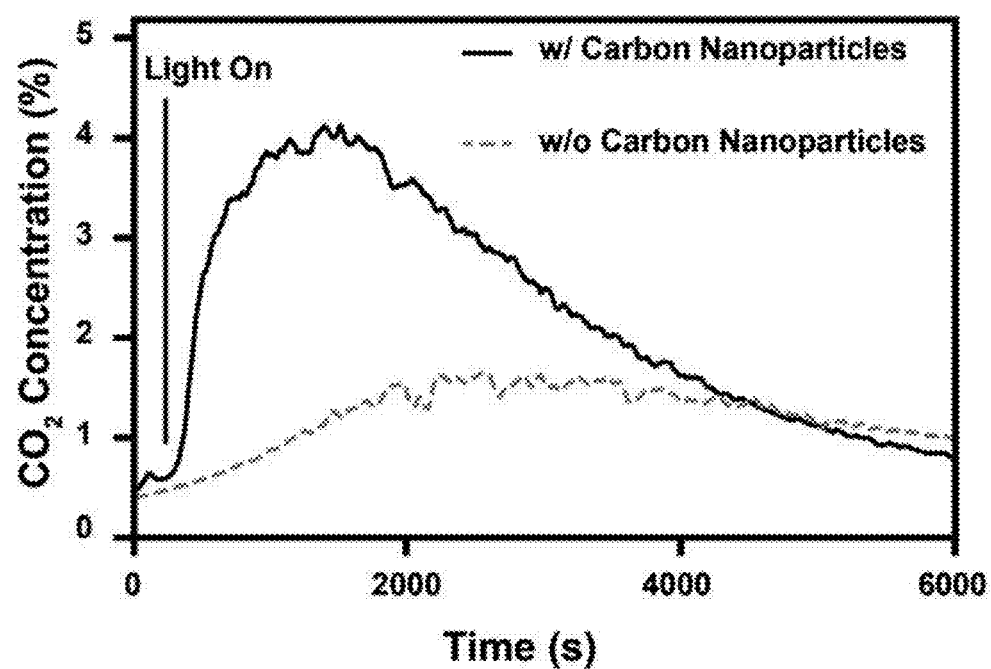
FIG. 4B shows a plot of $CO_2$ concentration versus time for an absorption liquid comprising a carbon nanoparticle and for absorption liquid without carbon nanoparticles (see Example 1).

As shown in FIG. 4B, release of $CO_2$ is triggered by light in MEA. After 2,000 sec, the maximum amount of $CO_2$ is released and the release rate of $CO_2$ slows. Some $CO_2$ is released without carbon black due to the IR transmittance of the light source, resulting in increased bulk fluid temperatures.

Example 2

Regeneration Efficiency as a Function of Carbon Nanoparticle Concentration

The data was collected as described in Example 1, using nanoparticle concentrations ranging from 0 wt % to 0.03 wt %.

Figure 5A:
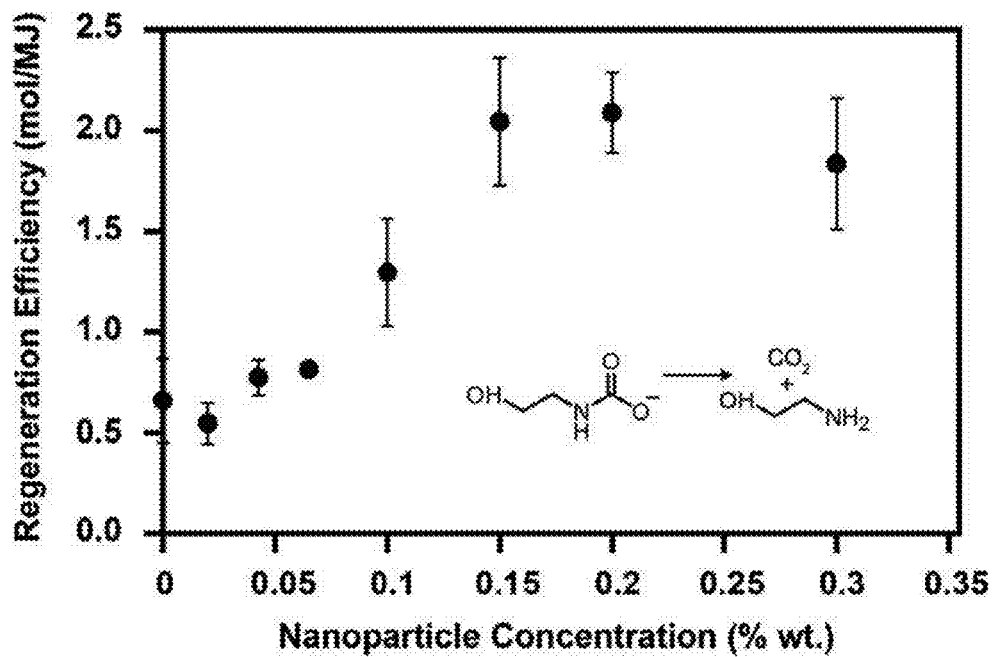
FIG. 5A shows regeneration efficiency as a function of nanoparticle concentration (see Example 2).

As shown in FIG. 5A, regeneration efficiency increased with increasing nanoparticles concentration. Bulk temperatures of the absorption liquid comprising nanoparticles reached 50° C.

Example 3

Regeneration Efficiency as a Function of Initial Temperature

The data was collected as described in Example 1. The bulk temperature of the solution was modulated by flowing preheated water through the solution via a stainless steel tube. This internal heating method was used to minimize the shading of the nanoparticle solution. The NCB concentration used in this example was 0.1 wt %.

Figure 5B:
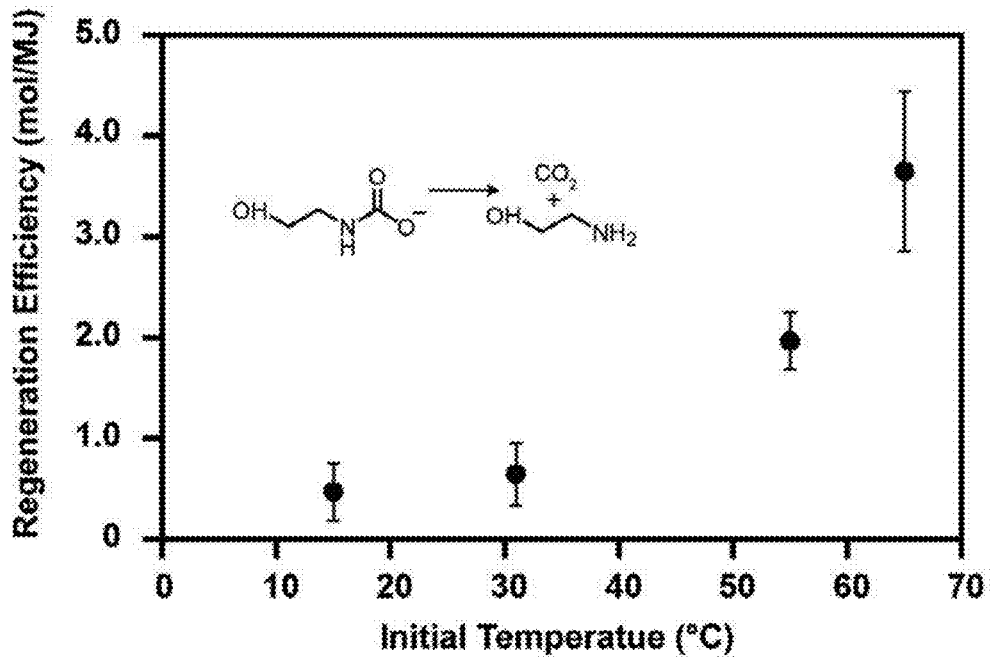
FIG. 5B shows regeneration efficiency as a function of initial temperature (see Example 3).

As shown in FIG. 5B, as the initial temperature of the absorption liquid is increased, an increase in the regeneration efficiency was observed. Thus, to achieve high efficient release, the solvent must be at a slightly higher temperature than room temperature. Consequently, some energy will be required to heat the absorption liquid.

Example 4

Regeneration efficiency of $CO_2BOL$

The data was collected as described as in Example 1. A combination of tetramethylguanidine and 1-butanol in dimethylformamide was used (0.5 M each). $CO_2BOLs$ bind $CO_2$ as an alkylcarbonate salt and do not require water as a solvent.

Figure 5C:
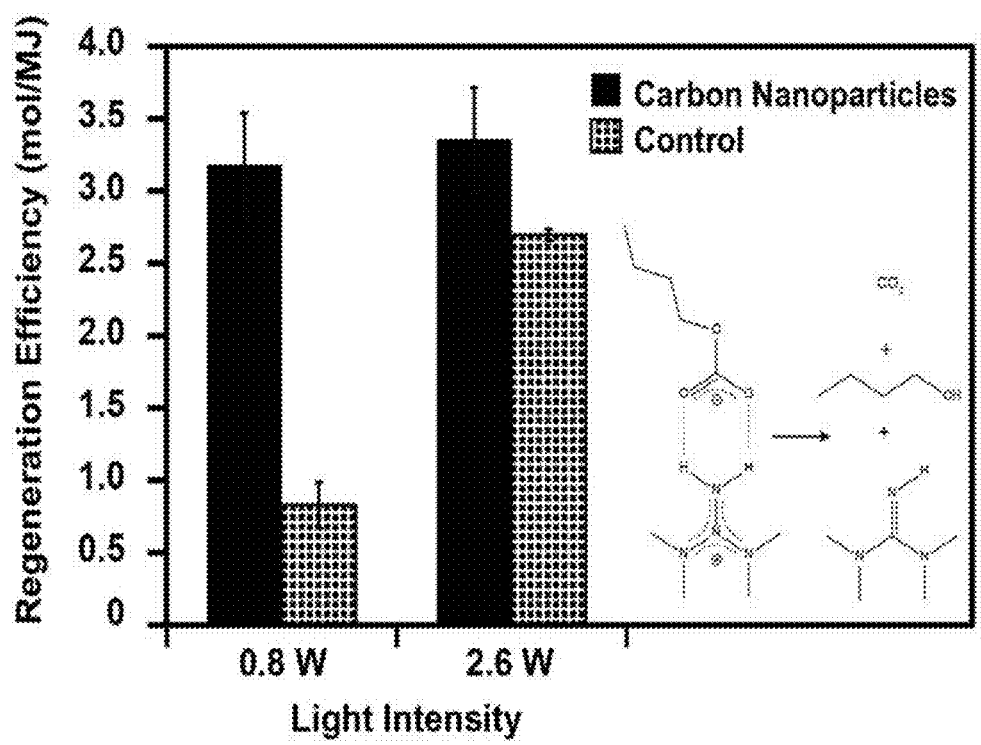
FIG. 5C shows regeneration efficiency using a $CO_2$ binding liquid ($CO_2BOL$) measured at two different light intensities (see Example 4).

As shown in FIG. 5C, the carbon black nanoparticles also released $CO_2$ in non-aqueous systems. Due to the lower desorption temperature profile of the $CO_2BOL$, the higher intensity light source was sufficient to remove $CO_2$ with and without nanoparticles. A lower intensity LED light source increases $CO_2$ regeneration only with nanoparticles present.

Example 5

Characterization of Nanoparticles—Size

Figure 6:
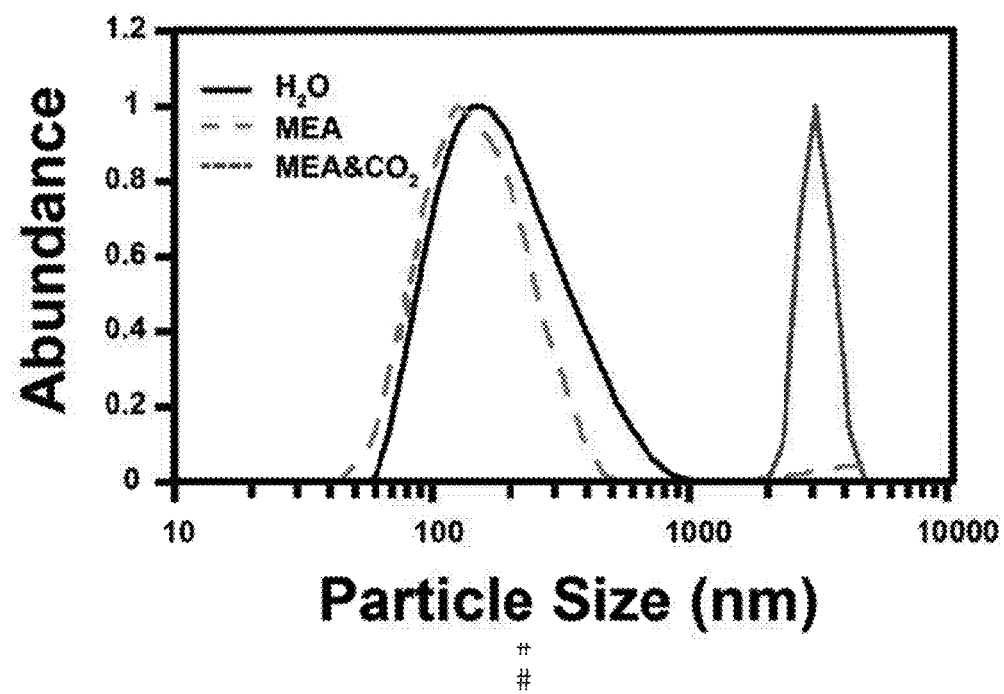
FIG. 6 shows nanoparticle size distributions in $H_2O$, MEA, and MEA with $CO_2$ (see Example 5).

The carbon black nanoparticles were characterized with respect to their size. The particle sizes were measured using a Malvern Zetasizer AZ Nano DLS. The nanoparticles were examined in water, MEA, and MEA loaded with $CO_2$. The nanoparticles were distributed within the liquids at 0.001 wt % and dispersed under ultra-sonication. As shown in FIG. 6, in water and MEA, the nanoparticle diameters ranged from 40 to 1000 nm, with an average of 200 nm. When $CO_2$ was introduced into MEA, the particles agglomerated, resulting in an average measured particle diameter of 3 μm.

Example 6

Characterization of Nanoparticles—Light Absorbance

The carbon black nanoparticles were characterized with respect to their light absorbance. The emission spectra of the selected light sources were examined using a Hitachi F4500 Fluorescent Spectrometer and a modified cuvette. A set of optical fibers ran to the cuvette so that the emission of the light sources could be monitored by the spectrometer. It should be noted that due to the IR absorbance of glass, only the spectra for the visible range ought to be considered.

Figure 7:
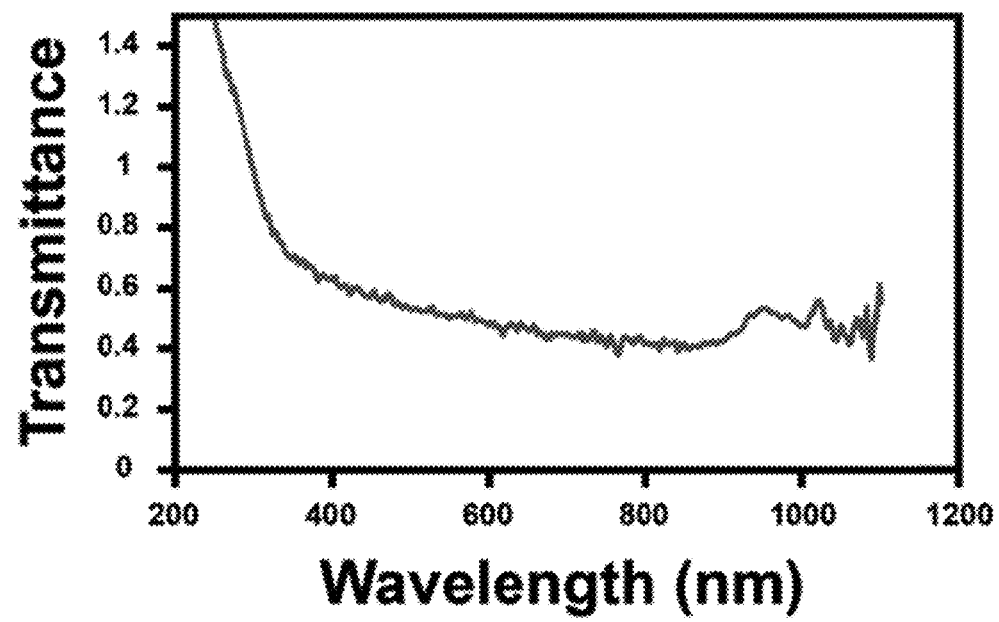
FIG. 7 shows UV-Vis transmittance of an absorption liquid comprising carbon black nanoparticles (NCB) (see Example 6).

As shown in FIG. 7, the absorbance of the carbon black nanoparticle varies little across the visible spectra. This could be useful for absorbing light from solar sources as the carbon black nanoparticle does not have a wavelength dependence and can absorb light from the entire solar spectra.

Example 7

$^{13}C$ NMR Measurements of Photothermal Process $^{13}C$ NMR measurements were performed on the monoethanolamine and NCB nanofluid at three points: before $CO_2$ absorption, after $CO_2$ absorption, and after $CO_2$ desorption.

Figures 8A, 8B, 8C:
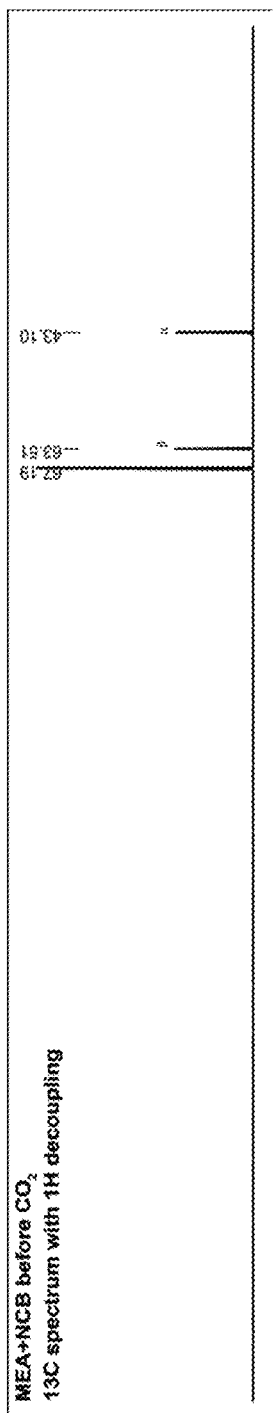
FIGS. 8A-C show $^{13}C$ NMR spectral measurements of photothermal processes (see Example 7).

As shown in FIG. 8, the $^{13}C$ NMR spectra confirm that $CO_2$ is released from the nanoparticles.

Example 8

$CO_2$ Regeneration in Flowing System

A continuous lab-scale solar stripper was used to evaluate the photothermal regeneration of $CO_2$ with solvents alternative to water. The continuous flow of $CO_2$ better mimics actual process conditions, rather than maintaining a static amount within the flask. The nanofluid pumping introduces fresh, saturated NCB nanofluid into the system. The introduction of fresh nanofluid also provides a cooling effect to the bulk liquid. As a result, the measured $CO_2$ release rate reaches a steady state rather than evolve over time.

The system operates similarly to the static desorption system with added modifications. A fully saturated NCB nanofluid was loaded into a 60 mL syringe. Two syringe pumps were connected to the flask: one injecting $CO_2$ rich nanofluid and one withdrawing nanofluid from the bottom of the flask. The pumps maintain a constant level of nanofluid within the flask, while also maintaining a steady state desorption profile.

Figure 9:
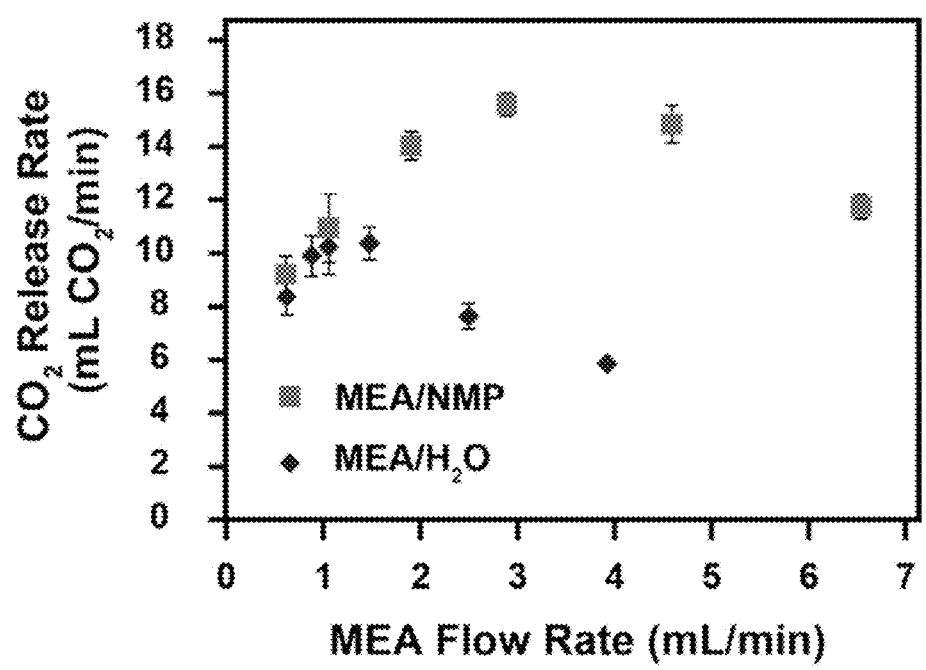
FIG. 9 shows a plot of $CO_2$ release as function of flow rate (see Example 8).

FIG. 9 shows the change in release rate as a function flow rate of the solution. This shows that a continuous process, which combines flowing absorption liquid with releasing $CO_2$, will provide much higher release rates and lower foot prints than static solutions.

Example 9

$CO_2$ Regeneration Properties of Different Solvents

The data was collected as in Example 1. The solutions used 30% wt. MEA and 70% wt. of indicated co-solvent. The results are provided in Table 1.

TABLE 1

| Co-Solvent | Total $CO_2$ Release (g) | Regeneration Efficiency (mol/MJ) | Maximum $CO_2$ Release Rate (mL/min) |
|---|---|---|---|
| Water | 1.10 ± 0.04 | 4.50 ± 0.40 | 11.2 ± 1.2 |
| Dimethylformamide | 1.10 ± 0.03 | 5.57 ± 0.36 | 11.9 ± 0.6 |
| N-Methyl-2-pyrrolidone | 0.86 ± 0.12 | 4.84 ± 0.62 | 9.0 ± 0.4 |
| Ethanol | 1.14 ± 0.07 | 6.93 ± 0.94 | 14.6 ± 1.0 |
| Ethylene glycol | 0.59 ± 0.13 | 1.37 ± 0.45 | 4.6 ± 0.9 |
| Dimethylacetamide | 1.10 ± .03 | 4.82 ± 0.42 | 11.3 ± 0.9 |
| 2-Methoxyethanol | 1.08 ± .06 | 3.98 ± 0.18 | 9.4 ± 1.4 |

As shown in Table 1, regeneration efficiency varies with solvent properties including boiling point, vapor pressure, and hydrogen bonding. These solvent properties can be used to enhance the release of $CO_2$ from an absorption liquid improving the efficiency of the process as well as increasing the rate at which $CO_2$ is leaving the absorption liquid.

While particular materials, formulations, operational sequences, process parameters, and end products have been set forth to describe and exemplify this invention, they are not intended to be limiting. Rather, it should be noted by those ordinarily skilled in the art that the written disclosures are exemplary only and that various other alternatives, adaptations, and modifications may be made within the scope of the present invention. Accordingly, the present invention is not limited to the specific embodiments illustrated herein, but is limited only by the following claims.

What is claimed is:

1. A method of recovering carbon dioxide from a gas stream, the method comprising:
    a. contacting a gas stream comprising carbon dioxide with an absorption liquid;
    b. contacting the absorption liquid with a nanoparticle, thereby forming a nanofluid; and
    c. photothermally releasing carbon dioxide from the nanofluid.

2. The method of claim 1, wherein the gas stream comprises flue gas.

3. The method of claim 2, wherein the flue gas is from coal combustions.

4. The method of claim 1, wherein the absorption liquid comprises a solvent selected from water, methyl -t-butyl ether, tetrahydrofuran, ethyl acetate, 2-propanol, dimethoxyethane, 2-butanol, 3-pentanol, 1-butanol, dimethylformamide, diglyme, 1-heptanol, 1-octanol, ethylene glycol, NMP, ethyl benzoate, diethyethylene glycol, di-n-butylphthalate or combinations thereof.

5. The method of claim 1, wherein the absorption liquid comprises an amine.

6. The method of claim 5, wherein the amine is monoethanolamine, diethanolamine or methyldiethanolamine, piperidine, piperazine, piperadone, piperidinol, diglycolamine, or diisopropanolamine.

7. The method of claim 1, wherein the absorption liquid comprises a $CO_2$ binding organic liquid.

8. The method of claim 7, wherein the $CO_2$ binding organic liquid comprises a base and an alcohol.

9. The method of claim 8, wherein the base is an amine, amidine, imidazole compound or a guanidine compound.

10. The method of claim 9, wherein the $CO_2$ binding organic liquid comprises 1,1,3,3-tetramethylguanidine or Barton's base.

11. The method of the claim 8, wherein the alcohol is butanol.

12. The method of claim 1, wherein the nanoparticle is carbon black.

13. The method of claim 1, wherein the nanofluid comprises from about 0.0001 wt % to about 1 wt % nanoparticle.

14. The method of claim 1, wherein step (c) comprises exposing the nanofluid to sunlight.

15. An apparatus for recovering carbon dioxide from a gas stream comprising:
    a. a boiler that generates steam from the combustion of a fuel and that generates a gas stream comprising carbon dioxide;
    b. a heat exchanger that heats an absorption liquid;
    c. an absorber that is supplied the gas stream from the boiler and that allows carbon dioxide in the gas stream to be absorbed in the absorption liquid;
    d. a solar stripper comprising nanoparticles that is supplied the absorption liquid from the absorber and that photothermally releases carbon dioxide gas from the absorption liquid;
    e. a compressor that compresses the carbon dioxide gas released in the solar stripper;
    f. a generator that produces energy for the carbon dioxide compressor; and
    g. a turbine that is supplied with steam from the boiler and that spins the generator.

16. The apparatus of claim 15, further comprising one or more solvent storage tanks.

17. The apparatus of claim 16, further comprising two solvent storage tanks.

18. The apparatus of claim 17, wherein the first solvent storage tank is supplied lean solvent from the solar stripper and the second solvent storage tank is supplied rich solvent from the absorber.

19. The apparatus of claim 15, further comprising a steam stripper.

20. The apparatus of claim 15, further comprising a power plant.

* * * * *